Nov. 11, 1930.    R. BRUNNER    1,780,969
PROCESS AND APPARATUS FOR PRODUCING ARTISTIC DESIGNS
Filed Feb. 26, 1926
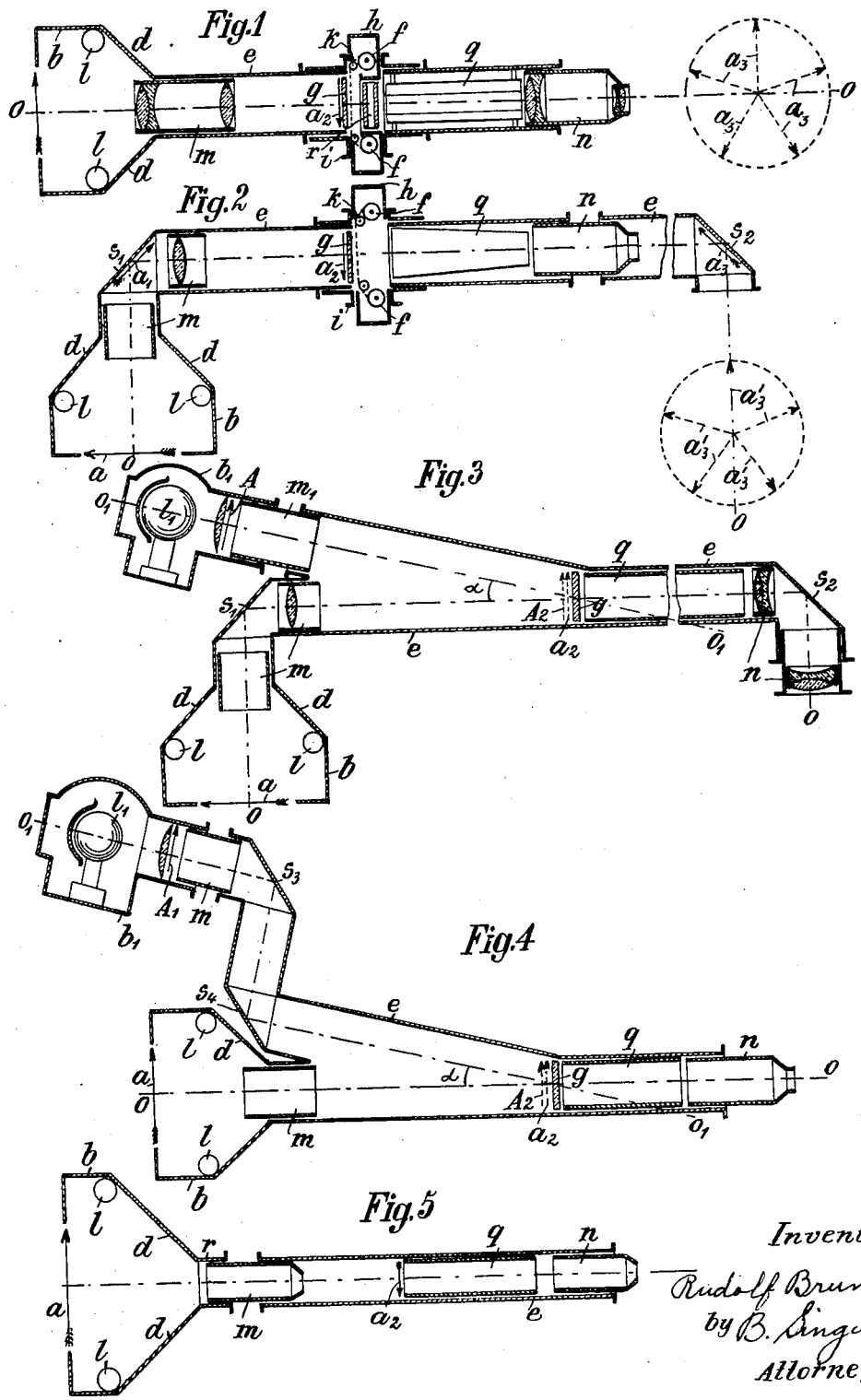
Inventor
Rudolf Brunner
by B. Singer
Attorney Patented Nov. 11, 1930

1,780,969

UNITED STATES PATENT OFFICE

RUDOLF BRUNNER, OF RÜSCHLIKON, NEAR ZURICH, SWITZERLAND

PROCESS AND APPARATUS FOR PRODUCING ARTISTIC DESIGNS

Application filed February 26, 1926, Serial No. 90,923, and in Switzerland March 5, 1925.

This invention relates to an improvement in methods for projecting kaleidoscopic images of one or more subjects. It is known to produce an image of plane subjects of translucent appearance or to combine such images for the purpose of creating kaleidoscopic pictures. But for applying opaque subjects of plane or other shape it was hitherto necessary to put them into a box arranged closely before the kaleidoscopic mirror system, and in consequence thereof the said box was only able to contain very small bodies as subjects. It is also known in se, to produce a real image of opaque plane or other bodies.

According to the present invention there is produced a real image of the opaque plane or corporeal bodies, which could not be applied till now as subject for kaleidoscopic projection, this image being projected on closely before the mirror system and serving as motive for kaleidoscopic projection.

It is possible thereby to increase in an unlimited manner the quantity and variety of the bodies applicable as subjects and to use any body as subject, these subjects hitherto having been produced by hand or the like on linen, rolled film, or similar carrier, abstraction having been made of the above mentioned box containing only small colored bodies, and producing simple and primitive effects.

It will also be able to project the real image of the desired subject on a carrier arranged closely before the kaleidoscopic mirror system, in such manner as to combine the said main motive with other plane ones. This carrier is substituted for the above mentioned box. As a carrier there may be applied a matte plate as in the camera obscura, disposed between the means for producing the real image and closely before the kaleidoscopic mirror system. This plate may also be substituted by a rolled film or the like, which may be colored or provided with drawings as additional motives for the purpose of increasing the variety of the objects possible.

In an especial case the image projected on the carrier for the kaleidoscopic picture can be produced by diascopy, while the other motives will be produced by episcopy. But it is also possible to episcopically produce on the said carrier images of more opaque bodies by means of separate light sources and even to combine them with other plane motives created diascopically.

The apparatus for carrying out the method described comprises a mouth piece of annular form, having the same lumen as the tube for the kaleidoscopic mirror system and the objectives for projecting the produced kaleidoscopic images on the screen. It will be possible by this arrangement to apply the said apparatus as a simple episcopic projector, after having detached the said tube with the mirror system and by changing the objectives.

Different diagrammatic forms for executing the method according to the present invention by way of example are shown in the annexed drawings, wherein Figure 1 is a diagram of apparatus by which the method for producing by means of one source of light a horizontal kaleidoscopic projection combined by a diascopic element and an episcopic element may be carried out.

Figure 2 is another diagram of apparatus for executing the method according to Figure 1, and in which the corporeal subject and kaleidoscopic projection are arranged in horizontal position.

Figure 3 is a similar view of apparatus for executing the method according to Figure 2 and in which two separate sources of light for the two combined elements are provided.

Figure 4 is a similar diagram of apparatus for executing the method and represents the corporeal subject and the kaleidoscopic projection in vertical position.

Figure 5 is a similar view of apparatus applicable simultaneously as an episcopic projector and as a kaleidoscopic projector for carrying out the method.

The subject $a$ (Figs. 1–5), is illuminated intensely by means of a source of light $l$ and with the help of reflectors $d$ arranged in the projector case $b$. It is also possible to use collecting mirrors and condensers for the purpose of producing a better episcopic illumination. In the case of living subjects cooled light may be used. As before said, any body may be used as a subject.

There is projected by means of the objective $m$ (Fig. 1), a real image $a_2$ of the lighted object $a$ to a glass plate or the like $g$, disposed closely before a kaleidoscopic mirror system $q$. The image $a_2$ produced can be further combined with a picture $k$ disposed on a rolled film $f$, the component element $k$ being situated closely behind the glass plate $g$ or the like. This additional element may also be provided on the plate $g$. Another objective $n$ is caused to project the kaleidoscopic image $a_3$ produced at the exit of the mirror system $q$ on a vertical screen for making it directly visible.

In Figures 1 and 2, the kaleidoscopic projection $a_3$ is represented after having drawn it in the drawing plane by folding.

The rolled film $f$ for the additional composition $k$ may be disposed in a case $h$ and by moving this latter perpendicularly to the optical axis $o$—$o$ in relation to the image $a_2$ changes of the kaleidoscopic projection $a_3$ may be produced. Other variations are realized by turning the composition $k$ about the optical axis $o$—$o$. For this purpose a tube $i$ containing the case $h$ may be turned by means of a guide disposed in the tube $e$. Another rolled film may be arranged closely before or behind the latter in the same manner, that is, movable in perpendicular relation to the optical axis or rotatable about it. A box $r$ disposed in the same way and containing small bodies or nonmixing liquids may be inserted in the neighborhood of the carrier $g$ in the path of the light rays. The plate $g$ may be translucent, semi-translucent or may also be partially so. It may also show opaque parts.

Figure 2 shows the diagram of the method according to Figure 1, both the object $a$ and the kaleidoscopic projection $a_3$ being arranged in vertical position. This is made possible by disposing on the one side of the apparatus for executing the method a mirror $s_1$ inclined under 45 degrees to the optical axis $o$—$o$ and by disposing another mirror $s_2$ inclined under the same angle on the other hand. There will be produced by the mirror $s_1$ an image $a_1$ of the subject $a$ on the one hand, and after projecting on the plate $g$ this image $a_1$ as image $a_2$, by the same optical means as in Figure 1 there will be produced on the mirror $s_2$ the kaleidoscopic projection $a_3$, made visible directly by being projected as $a_3$ in the horizontal plane.

The method according to the invention enables especially to project on two superposed elements on the carrier $g$, as represented diagrammatically in the case of two separate sources of light in Fig. 3. The objectives used are $m$ and $m_1$, the relative optical axis $o$—$o$ and $o_1$—$o_1$, intersecting under an angle $d$.

The objective $m$ is projecting on in episcopic way the image $a_2$ of the subject $a$ to the carrier or the like $g$, while the objective $m_1$ projects by diascopic illumination the image $A_2$ of a translucent or semitranslucent subject $A$ to the carrier or the like $g$. The source of light $l_1$ is situated in an additional case $b_1$. The objectives $n$ are arranged before respectively under the mirror $s_2$.

Figure 4 shows a modification of the method according to Figure 3 by arranging in a vertical position the subject $a$ and by projecting in the same or nearly the same position the picture $a_3$. In the path of the light rays of the objective $m_1$ there are inserted two mirrors $s_3$ and $s_4$ rendering possible a more commodious form of the apparatus for executing the method. But it seems also possible to combine the superposed image $a_2$ produced by diascopic way with the kaleidoscopic picture $a_3$ directly on the screen.

In Figure 5 a simple device for executing the kaleidoscopic picture producing method according to the invention is represented, the lumen of the annular mouth piece $r$ being of the same diameter as that of the support tube $e$ of the mirror system $q$. The method of using the said device for kaleidoscopic picture projection is that to insert in the mouth piece $r$ instead of the objective $n$, by means of which it may be used simply as an episcopic projector, the objective $m$ and the inner end of the tube $e$ the middle part of which serves as a support for the mirror system $q$, while the free outer end will accept the objective $n$ for kaleidoscopic projection.

The kaleidoscopic pictures $a_3$ projected may be fixed on sensitive paper or the like by the additional arrangement of photographic devices in a manner known.

What I claim is:

1. Process for episcopically and diascopically projecting kaleidoscopic images of one or more subjects, consisting in producing a real image of a distant opaque body closely before a mirror system, and in projecting the kaleidoscopic picture produced therein to a screen.

2. Process for projecting kaleidoscopic images of one or more subjects, consisting in producing a real image of a distant opaque plane body closely before the mirror system, and in projecting the kaleidoscopic picture produced therein to a screen.

3. Process for projecting kaleidoscopic images of one or more subjects, consisting in producing a real image of a distant opaque corporeal body closely before the mirror system, and in projecting the kaleidoscopic picture produced therein to a screen.

4. Process for projecting kaleidoscopic images of one or more subjects, consisting in producing a real image of an opaque body on a carrier situated closely before the mirror system and in projecting the kaleidoscopic picture produced therein to a screen.

5. Process for projecting kaleidoscopic images of one or more subjects, consisting in producing a real image of an opaque body on a carrier showing additional motives, said carrier being situated closely before the mirror system, and in projecting the kaleidoscopic picture produced therein to a screen.

6. Process for projecting kaleidoscopic images of one or more subjects, consisting in producing a real image of an opaque body on a carrier showing additional motives, said motives being diascopically produced, the carrier being disposed closely before the mirror system, and in projecting the kaleidoscopic picture produced therein to a screen.

7. Process for projecting kaleidoscopic images of one or more subjects, consisting in producing a real image of an opaque body closely before the mirror system, this image being produced episcopically, and in projecting the said picture through the kaleidoscopic mirror system and to a screen.

8. Process for projecting kaleidoscopic images of one or more subjects, consisting in producing a real image of an opaque body closely before the mirror system, this image being produced episcopically, combining the said real image with additional motives, and projecting the superposed picture through the kaleidoscopic mirror system to a screen.

9. Process for projecting kaleidoscopic images of one or more subjects, consisting in producing a real image of an opaque body closely before the mirror system, this image being produced episcopically, combining the said real image with additional motives, said motives being produced diascopically, and in projecting the superposed picture through the kaleidoscopic mirror system to a screen.

10. Process for projecting kaleidoscopic images of one or more subjects, consisting in producing a real image of an opaque body closely before the mirror system, this image being produced episcopically, combining the said real image with additional diascopically produced motives, and in projecting the real image through the kaleidoscopic mirror system to a screen, so that the superposition of both images, the episcopic and the diascopic, occurs on the screen.

11. Process for projecting kaleidoscopic pictures of one or more subjects, consisting in creating the said kaleidoscopic pictures by means of an episcopic projector by producing a real image of an opaque body closely before a mirror system inserted in a tube, after having exchanged the projecting objective of the episcopic projector with another and after having inserted in the free end of said objective the mentioned tube with the mirror system, the free outer end of the said tube accepting the objective of the episcopic projector, and in projecting the real image through the mirror system and to a screen.

In witness whereof I affix my signature.

RUDOLF BRUNNER, Dr. Ing.